United States Patent [19]
Coughlin et al.

[11] 3,884,806
[45] May 20, 1975

[54] METHOD AND APPARATUS FOR CENTRIFUGALLY REGENERATIVE FILTRATION

[75] Inventors: Robert W. Coughlin, Bethlehem, Pa.; Joseph R. Polek, Baltimore, Md.

[73] Assignee: Robert W. Coughlin, Bethlehem, Pa.

[22] Filed: Dec. 26, 1972

[21] Appl. No.: 318,266

[52] U.S. Cl. .................................. 210/78; 210/81
[51] Int. Cl. ........................................... B01d 33/04
[58] Field of Search ...................... 210/78, 81, 374

[56] References Cited
UNITED STATES PATENTS

| | | | |
|---|---|---|---|
| 3,040,893 | 6/1962 | Schmiedel | 210/78 X |
| 3,477,098 | 11/1969 | Swickard et al. | 210/78 X |
| 3,718,220 | 2/1973 | Titus | 210/374 X |

*Primary Examiner*—Roy Lake
*Assistant Examiner*—E. F. Desmond

[57] ABSTRACT

This specification discloses a process and apparatus for filtering particles from fluids wherein the residue of particles which would otherwise accumulate on and block the filtration medium is removed therefrom by centrifugal force, thereby providing a process of filtration in which the filtered particles are removed from the site of filtration and do not accumulate to impede the flow of filtrate. This abstract is neither intended to define the invention which, of course, is measured by the claims, nor is it intended to be limiting as to the scope of the invention in any way.

10 Claims, 7 Drawing Figures

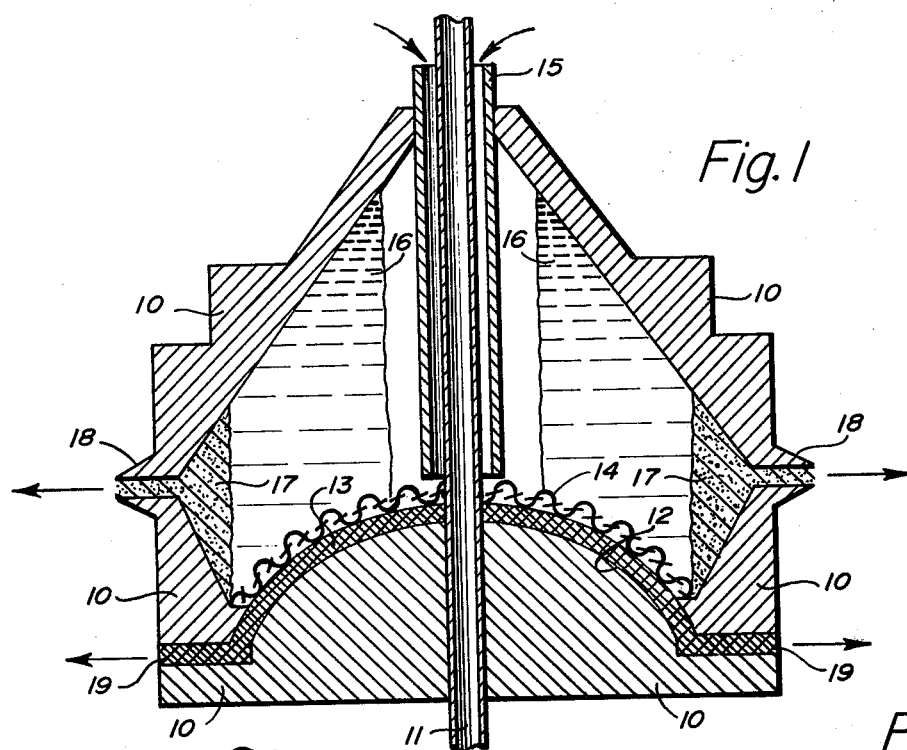
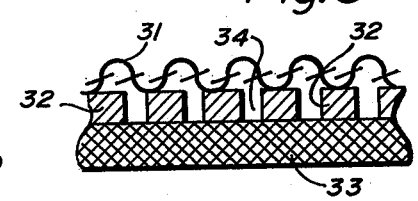
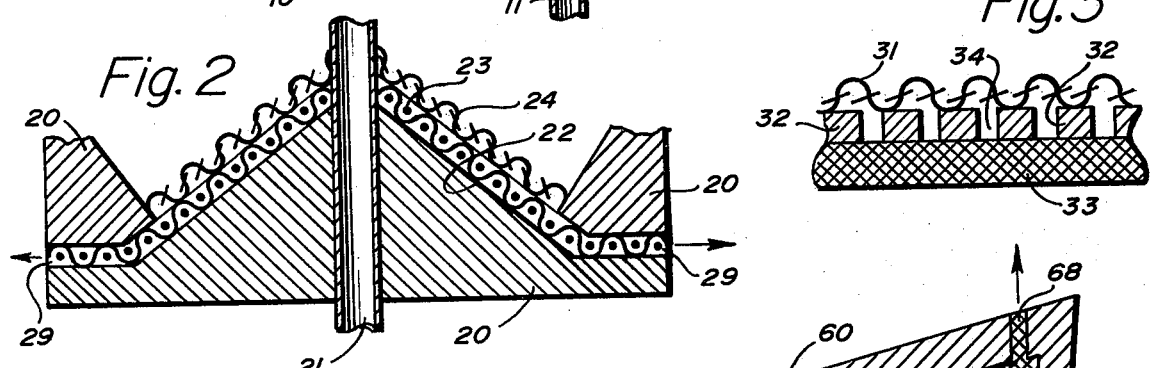
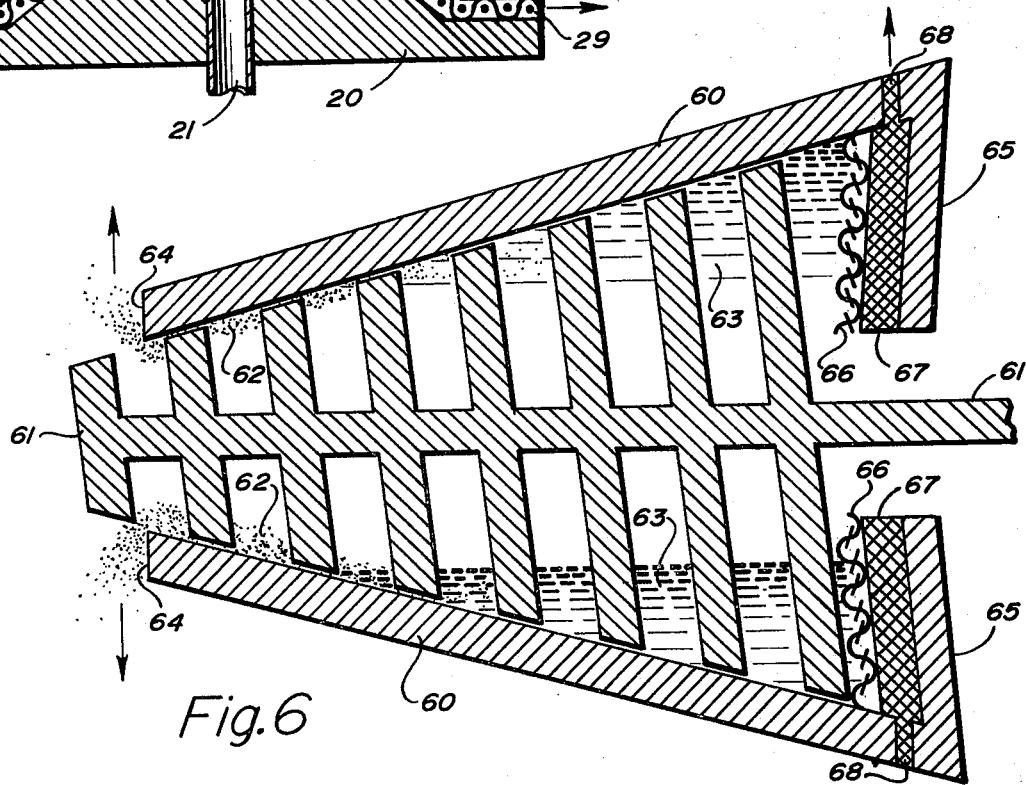

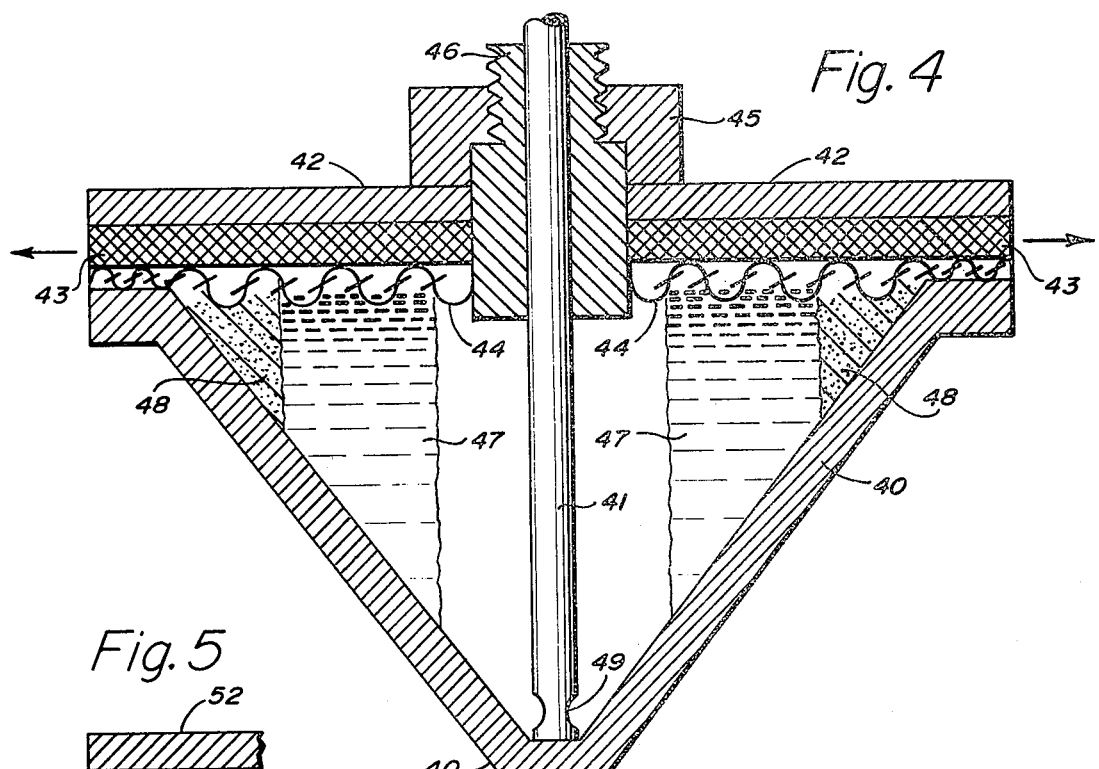
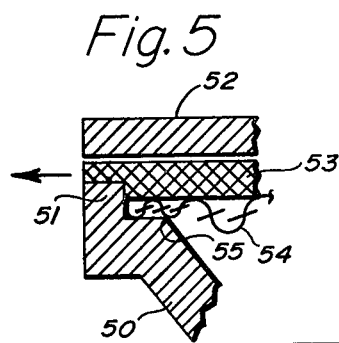
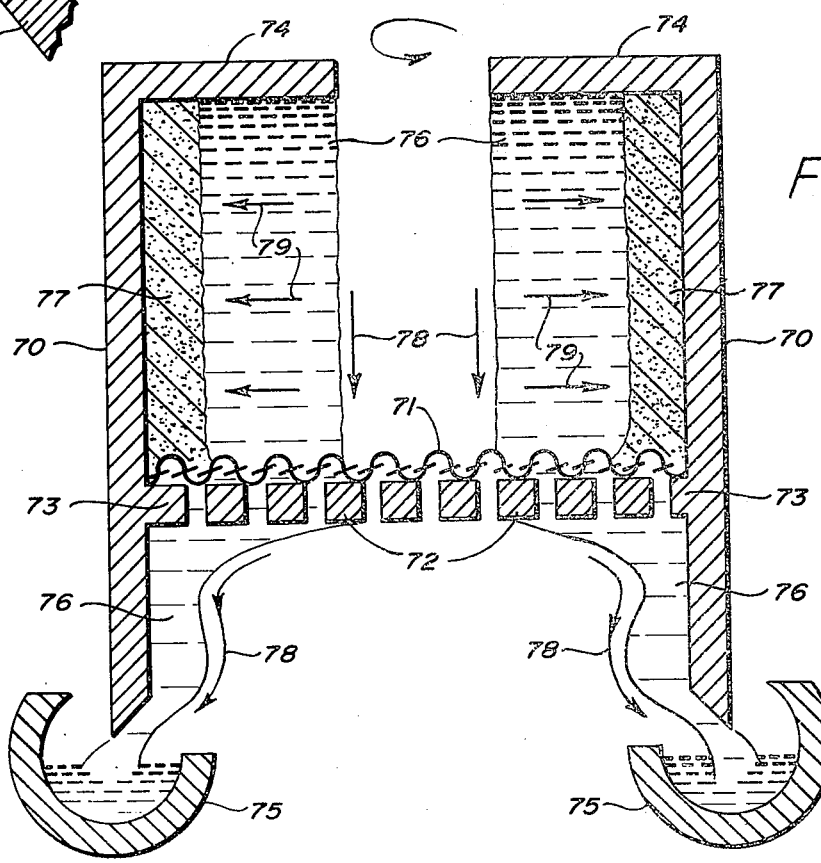

METHOD AND APPARATUS FOR CENTRIFUGALLY REGENERATIVE FILTRATION

BACKGROUND OF THE INVENTION

1. Field of Invention

This invention provides a means of filtration wherein filtered residue is prevented from accumulating to an appreciable extent on the filtration medium due to the operation of centrifugal force. During filtration, according to the present invention, centrifugal force removes filtered residue from the filtration medium and also prevents some of the particles-to-be-filtered from reaching the medium in the first place. In a preferred form of this invention for filtering particles from fluids, the particles and accumulated filtered particulate residue move in a radial direction away from the site of filtration toward the wall of a centrifugal container while fluid passes through the filtration medium in a non-radial direction. Because the centrifugal removal of solids from the filtration medium during the filtration process regenerates the filtration medium, the process of this invention is referred to herein as centrifugally regenerative filtration (CRF).

This invention relates to a process and to a device for separating particulate matter by filtration from fluids in which such particles are suspended, by introducing the mixture of fluid and particles into a rotating container or receptacle having a filtration medium and a porous or perforate support for said medium, with medium and support so arranged that a component of centrifugal force acts to remove filtered residue from said medium in a direction different from the principal path of flow of fluid through said medium, and, in a preferred embodiment, with the filtration medium facing in a direction ranging from parallel to, to away from said axis, wherein the fluid flows through the filtration medium, the particulate matter is restrained by and does not flow through said filter medium, and the particulate-matter residue which would ordinarily accumulate (frequently forming a flow-resistant filter cake) on said filtration medium is continuously removed therefrom or prevented from reaching said medium by the action of centrifugal force.

2. Description of Prior Art

Processes and devices for filtering particles from fluids have been known from ancient times and one of the traditional major difficulties in the art of filtration has been the accumulation of the residue formed by the filtered particles at the site of filtration, the filtration medium. As said residue builds up at the filtration medium it presents an increasing resistance to fluid flow and flow eventually becomes sufficiently slow that the process must be stopped in order to remove the accumulated residue. In more recent times the operation of filtration has already been improved by techniques which:

1. Move the filter medium with the accumulated residue formed thereon out of the mixture to be filtered to a zone where said residue, (often in the form of a filter cake), is removed, usually by a knife, whereupon the medium is moved back into the mixture to be filtered and the cycle can begin again. Such a cycle is embodied in the operation of a rotary-drum filter.

2. Introduce the mixture to be filtered into a centrifugally rotating container or receptacle having perforate or porous walls upon the inner surface of which the filtration medium is supported in such a way that the medium faces the axis of rotation, the fluid being forced by centrifugal force to pass through said filtration medium in a radial direction away from the axis of rotation, the particulate residue thereby accumulating on the inside surface of the filtration medium. Such a device is often termed a basket centrifuge or centrifugal filter.

The present invention differs from the processes and devices described above under 1. (rotary drum filtration) and 2. (ordinary centrifugal filtration) in that, in the present invention:

A. The filter medium is not moved from the site of filtration.

B. Accumulated particulate matter is removed from the site of filtration at the filtration medium (or prevented from reaching the medium) by the action of centrifugal force during the filtration process.

C. The filtration medium is so arranged that a component of centrifugal force acts to remove filtered residue from said medium in a direction different from the principal path of flow of fluid through said medium, and, in a preferred embodiment, with the side of said medium that encounters the mixture to be separated facing in a direction that is parallel to or away from the axis of rotation.

D. The flow path of particles and accumulated particulate residue is in the radial direction toward the wall of the centrifugal container whereas the principal flow path of fluid through the regenerated filtration medium is in a non radial direction.

In summary, the present invention differs from both ordinary rotary-drum filtration and from ordinary centrifugal filtration in that in the present invention the filtration medium and its support are so arranged that a component of centrifugal force acts to remove filtered residue from said medium in a direction different from the principal path of flow of fluid through said medium, and, in a preferred embodiment, with the side of said medium that encounters the mixture to be separated facing in a direction that is parallel to or away from the axis of rotation, in that the principal flow path of fluid through said filtration medium is not perpendicular to the axis of rotation, and in that centrifugal force is utilized to remove accumulated residue of particulate matter from the filtration medium, or to prevent particles from reaching the medium in the first place, thereby preventing the build-up on the medium of a mass that could impede the continuing flow of fluid to the medium.

In a centrifugal filter of a different type which is disclosed in U.S. Pat. No. 3,464,554 to Laut, filtration takes place through a peripheral filter space formed by the juxtaposition of a solid circular receptacle and an imperforate cover overlying the upper edge of said receptacle. The present invention differs from that of Laut in that the former can make use of the more usual types of porous filtration media such as cloth or paper spread over a support consisting of a screen or a porous, perforated member or a solid member with channels in its surface contacting said medium, through which support the fluid flows after it has passed through the filtration medium. In the diclosure by Laut, filtration takes place through and by virtue of the small peripheral space defined by the circular receptacle and its cover, not by flow through the more usual type of filtration medium and an associated support. Moreover, in the Laut invention, centrifugal force causes the particulate residue to accumulate at the site of filtration, the peripheral filter space, whereas in the present invention centrifugal force tends to remove the particulate residue from the site of filtration, and to prevent particles from reaching said site in the first place, thereby preventing the build-up of material resistant to flow at the filtration medium.

Until the present invention there has been no technique of preventing or continuously removing the accmulation of filtered residue from the site of filtration at the filtration medium, thereby preventing the accumulation during the filtration process of a resistance to flow due to the presence of said residue. The present invention makes use of centrifugal force to remove or prevent accumulation of said residue from the site of filtration, as well as to generate pressure in the fluid to force the fluid through the filtration medium and then eject it from the filtration device. By removing the particles from the filtration medium, and by preventing some particles from reaching the medium in the first place the present invention provides a far improved and more rapid method of filtration.

SUMMARY OF THE INVENTION

It is an object of this invention to provide an improved means of removing particulate matter from a mixture thereof with a fluid.

It is another object of this invention to provide a process whereby solid or liquid particles can be removed from a fluid by the filtering action of a filtration medium and wherein centrifugal force prevents some particulate matter from reaching said medium and causes the residue of particulate matter which does accumulate on said medium to be removed therefrom, thereby speeding filtration and preventing the development of undesirable flow resistance.

It is a further object of this invention to provide a process whereby particulate matter may be continuously filtered from a fluid using a filtration medium, whereby some of the particles are prevented from reaching the medium by the action of centrifugal force and whereby said filtration medium is continuously regenerated by removal of particulate-matter residue therefrom by the action of centrifugal force.

Still another object of this invention is to provide a means of separating from a liquid, particles of solid or of another liquid dispersed therein, by means of a filter medium so arranged in a rotating centrifugal container that some particles are prevented from reaching the filtration medium by centrifugal action and accumulated particulate residue is continuously removed from the filtration medium by centrifugal force, the clarified liquid being forced to flow through said filtration medium and ejected from said container by centrifugal force, and the concentrated particulate residue being removed from said container by use of a screw conveyor, a reciprocating pusher or through nozzles at the periphery of the container.

Yet another object of this invention is to provide a centrifugal device for filtering particles from a fluid in which they are suspended, which device incorporates a novel arrangement of filtration medium and associated support, and which arrangement permits accumulated residue to be continuously removed from said medium by centrifugal action.

These and other objects have now herein been attained by a process and device for separating particles from a fluid, which uses common filtration media for filtration, which employs centrifugal force for preventing particles from reaching the filtration medium and for continuously removing accumulated particulate residue from the filtration medium, which employs centrifugal action for removing fluid from the container wherein filtration takes place, and which may also employ centrifugal action or other suitable mechanical means for removing accumulated particulate residue from said container.

DESCRIPTION OF THE DRAWINGS

Other objects and advantages of the invention will appear during the course of the following descriptions in connection with the accompanying drawings which exemplify forms the invention may assume. The embodiments discussed here are presented herein for purposes of illustration only and are not intended to be limiting in any manner.

FIG. 1 is a sectional diagram of a device for carrying out centrifugally regenerative filtration (CRF) according to the present invention; it consists essentially of a typical solid bowl centrifuge with the filter medium and its support so arranged as to practice CRF according to the present invention. The device as shown has provision for continuous removal of solids through nozzles in the solid bowl centrifuge as well as for continuous removal of filtrate.

FIG. 2 is a sectional diagram of a different arrangement of filtration medium and support as might be employed in the device of FIG. 1 for carrying out CRF.

FIG. 3 shows in section still another arrangement of filtration medium and associated medium support with said arrangement being of a novel type particularly suited to the practice of CRF according to the present invention.

FIG. 4 is a sectional diagram of a modified form of the upper part of the device described by Laut in U.S. Pat. No. 3,464,554, the modification comprising the inclusion therein of a filtration medium and support in an arrangement that permits the practice therewith of CRF according to the present invention.

FIG. 5 shows in section, how the Laut device might be further modified, at the periphery of the bowl and cover, in order to better practice CRF according to the present invention.

FIG. 6 shows in section a horizontal, solid-bowl, screw-conveyor type of centrifuge, modified by including therein a filtration medium and support in an arrangement that allows CRF according to the present invention to be practiced therewith, and permits continuous removal of accumulated particulate residue therefrom by means of said screw conveyer.

FIG. 7 is a sectional diagram of a simple centrifugal filtration device for carrying out CRF according to the instant invention. This device, because of its simplicity, is suitable for use as a laboratory filter.

Referring to FIG. 1, the number 10 designates the rotating solid metallic bowl of a centrifuge which rotates on rotational shaft 11 (shaft not shown in section). Means for rotating the bowl 10, while necessary, are not shown in FIG. 1. The bottom interior of said solid bowl 10 has a spherical or elipsoidal convex surface 12 covered with a layer of randomly porous material 13 which forms a support for the filtration medium 14 which rests thereon. Feed consisting of liquid and solid particles enters the machine at the top as shown by arrows through the annular space formed by the pipe 15 and the shaft 11. Due to the centrifugal force and the centrifugal field generated by the rotating bowl 10, liquid 16 held up in the bowl forms a layer along the inner wall of the bowl 10 as shown. Heavy particles tend to settle in a direction away from the rotational axis (or the rotational shaft 11) and away from the filtration medium 14 and to accumulate as a compacted mass 17 in the outermost portions of the bowl near the nozzles 18. Ports 19 are also provided around the wall of the bowl 10, at evenly spaced intervals, which ports 19 communicate with the randomly porous support 13 thereby allowing filtered liquid to be conducted through said porous support 13 to said ports 19 where liquid is ejected from the bowl as shown by the arrows. The filtration medium 14 may be of paper, cloth, spun-bonded synthetic-polymeric fibers, porous, sintered ceramic or metal or other suitable material. It is also possible that the filtration medium 14 be a layer of filter aid deposited from the liquid onto or within the support 13. The filtration medium 14 should be of a material of sufficiently low density that it is held in place by the liquid and by gravity and not disrupted by the centrifugal field. The nozzles 18, which are evenly spaced around the periphery of the bowl, may be equipped with flow control valves either externally or internally actuated as is commonly the case for such solid-bowl centrifuges; such valves are not depicted in FIG. 1. The support 13 for the filtration medium 14 may be of a randomly porous metal such as sintered steel or of a randomly porous synthetic material such as Teflon or Nylon. In a preferred embodiment the support 13 is more porous and less resistant to flow in its pores than the medium 14 and said support is rigid and firmly attached to the bowl 10. The comments concerning the filtration medium 14 and the porous support 13 for the device of FIG. 1 also apply to the filtration media and randomly porous supports of the other devices described below.

FIG. 2 shows only the bottom portion of another device similar to that of FIG. 1, but with another possible arrangement of the filtration medium 24. In FIG. 2 the bottom 22 of the solid bowl 20 is conical in shape and is covered with a screen 23 which serves as a support for the filtration medium 24. Said screen can be of metal or synthetic polymeric wire or other suitable material. Also shown in FIG. 2 are liquid exit ports 29 evenly spaced around the periphery of the bowl and the rotational shaft 21.

For the filtration medium support (either 13 in FIG. 1 or 23 in FIG. 2) may be substituted suitable open channels machined into the bottom (12 in FIG. 1 or 22 in FIG. 2) of the solid bowl. Said open channels should communicate with the filtration medium arranged thereover and lie in such radial directions so as to conduct filtered liquid from the bowl to the liquid exit ports (19 in FIG. 1 or 29 in FIG. 2) and the bowl material between such channels should be sufficiently high so as to prevent leakage around the filtration medium into the liquid exit ports.

In FIG. 3 is shown a particularly advantageous arrangement for supporting the filtration medium 31 for CRF. Here the filtration medium 31 is supported by a perforated metal or polymeric plate 32 which in turn is supported by a randomly porous plate 33. The perforations in the plate 32 are designated by the number 34.

FIG. 4 shows a centrifugal filter comprising a rotatable solid bowl 40, a hollow shaft 41, a solid cover 42. Also comprising this device and situated between solid cover 42 and solid bowl 40 is a randomly porous support plate 43 and a filtration medium 44. The cover 42 is firmly secured over the support plate 43 and the medium 44 by means of the nut 45 and the threaded member 46 which is securely and rigidly attached to the shaft 41.

FIG. 4 also shows the liquid layer 47 and the accumulated particulate residue 48 as they are disposed during operation. The hollow shaft 41 is provided with liquid inlet holes 49. The device shown in FIG. 4 consists in major part of that disclosed by Laut (U.S. Pat. No. 3,464,554), but with the added features here of porous support plate 43 and filtration medium 44 which allow it to be used to practice CRF according to the instant invention. Means for rotating the bowl 40, although necessary, are not depicted in FIG. 4.

FIG. 5 shows how the device of FIG. 4 can be improved to better carry out CRF, the specific improvements being at the periphery of the bowl and of the randomly porous support plate. Only the peripheral portion of the device is shown in FIG. 5 wherein the bowl 50 is provided with an upwards protruding peripheral lip 51. The cover 52 is held tightly against said lip 51 with the randomly porous support plate 53 protruding into the space between, and tightly held by, bowl lip 51 and cover 52. The randomly porous support plate 53 may be sufficiently plastic as to be slightly compressed in the space between bowl lip 51 and cover 52 or, if said plate 53 is very rigid, it may be machined at its periphery to provide a good fit as shown. The filtration medium 54 fits snugly against the lip 51 and rests upon the shoulder 55 also provided near the periphery of the bowl 50. The filtration medium 54 does not extend into the peripheral space between bowl lip 51 and cover 52.

FIG. 6 depicts a horizontal centrifuge with a solid rotatable conical bowl 60 and a screw conveyor 61 for transporting solids 62 along the wall of the bowl 60 from underneath the layer of liquid 63 and over the small end 64 of the bowl where the solids are discharged from the bowl by centrifugal force as shown by the arrows. Means for rotating the bowl are also necessary but are not shown. The construction and operation of the aforesaid aspects of this device may be further clarified and understood by reference to pp. 403–405 and FIG. 7–58 of *Unit Operations of Chemical Engineering* by McCabe and Smith, McGraw-Hill Book Company, Inc., New York 1956. The device of FIG. 6 is further provided at the larger end of the bowl with a solid cover 65, a filtration medium 66 and a randomly porous support 67. The porous support 67 extends into liquid exit ports 68 arranged at regular spacings along the wall of the bowl. Means should also be provided for holding the solid cover 65 against the bowl 60 but such means are not shown in the diagram.

In FIG. 7 is depicted a device for carrying out CRF that is of very simple construction and readily adaptable for use in the laboratory. It comprises a centrifugally rotatable pipe 70, a filtration medium 71 in the form of a circular disc, a rigid filtration medium support 72 also in the form of a circular disc and shown in FIG. 7 as perforated, but it may also be of randomly porous material or it may be a suitable screen. Means for rotating the pipe on its long axis are necessary but are not shown in the diagram. Support 72 is firmly secured along its periphery at 73 to the inner wall of the pipe with a leak-tight seal. A circular dam 74 is provided at the top of the pipe to prevent overflow of liquid from the top of the device during operation. A circular open conduit 75 situated beneath the pipe 70 is also provided for intercepting filtrate as it leaves the bottom of the pipe 70. Layers of liquid 76 and solids 77 are also shown along the inner wall of the pipe in the forms they assume during operation.

DESCRIPTION OF OPERATION

The rotating device of FIG. 1 is fed at the top with a mixture of liquid and solids through the annular space between shaft 11 and pipe 15 as shown by the arrows. The mixture is forced by centrifugal force towards the wall of the rotating bowl 10 whereupon it enters the layer of liquid 16 held in place against the wall by centrifugal force. Some of the solid particles settle toward the inner wall of the bowl 10 from the liquid 16 and join the compressed particulate mass 17. The pressure developed in the liquid layer by centrifugal force causes the liquid to flow through the filtration medium 14 into the porous support 13, then within and through the porous support 13 in directions approximately parallel to the filtration medium 14 until said liquid reaches liquid exit ports 19 whence it is discharged from the device as shown by the arrows. Particulate material which would otherwise accumulate on the filtration medium 14 during the filtration process is removed from said medium and caused to settle toward the wall by centrifugal force, thereby preventing the accumulation of significant particulate residue on said medium, which accumulation could interfere with and slow the filtration process. The particulate residue 17 which accumulates at the bowl wall near the nozzles 18 passes through said nozzles and from the bowl in a direction shown by the arrows.

The construction and operation of many aspects of the device of FIG. 1 can be further understood by reference to pp 400–402 and FIGS. 7-56 and 7-57 of the aforesaid reference by McCabe and Smith as well as to pp 325–332 of *Industrial Filtration of Liquids* by D. B. Purchas, CRC Press, Cleveland 1967. From such references it will be clear to one of ordinary skill in the art that the device of FIG. 1 is also applicable to the continuous separation by CRF of mixtures comprising solids and more than one liquid, using obvious modifications which preserve the aspect of centrifugal regeneration of the filtration medium by the action of centrifugal force. The device of FIG. 1 is further applicable without signficant modification to separating mixtures such as particles of water dispersed in oil by using a hydrophobic filtration medium that is wet by and admits the flow of oil but not water. A disc stack may also be placed in the device of FIG. 1 to provide greater settling area. Such disc stacks are discussed in the aforesaid references.

In the modification shown in FIG. 2 of the device of FIG. 1, the liquid to be filtered by CRF passes through medium 24 into the space defined and occupied by the screen 23, then through the said space in directions approximately parallel to the medium 24 to exit ports 29 where the filtrate is discharged from the device as shown by the arrows.

In the arrangement of filter medium 31 and perforated support plate 32 shown in FIG. 3, the liquid passes through the medium 31, then through the perforations 34 of support plate 32 and into porous plate 33. Liquid flow then continues in said porous plate 33 in directions approximately parallel to the filtration medium to points of discharge from the device which incorporates said arrangement.

A mixture of liquid and solid particles to be separated by CRF enters the rotating device of FIG. 4 at the top through the hollow shaft 41 and entrance holes 49 and joins the layers of liquid and solids distributed along the wall of the rotating bowl as shown. Liquid is filtered through the medium 44 driven by the pressure developed in the liquid by centrifugal force. After passage through the medium 44 the filtered liquid enters the porous support 43 and flows therein radially in paths approximately parallel to the medium 44 and the top 42. When the liquid reaches the periphery of the device it is discharged therefrom as shown by the arrows. Solid particulate residue or filter cake which would ordinarily accumulate on the filtration medium 44 is continuously removed therefrom by centrifugal force, being carried thereby to the inner wall of the bowl 40 where it accumulates as a compacted mass 48. Some of the solid particles will settle through the liquid layer 47 to the wall before said particles are carried to and reach the medium 44. When the bowl becomes filled with solids, the operation must be interrupted, and the device dismantled and the bowl 40 cleaned of accumulated residue 48.

FIG. 5 shows a preferred construction of a part of the device shown in FIG. 4. In FIG. 5 is depicted the periphery of the bowl 50 which here includes a lip 51 which, together with the porous support 53, forms a tight seal with the filtration medium 54 and prevents leakage of unfiltered mixture around the filtration medium and between the medium and the bowl. Such leakage can occur frequently with the unimproved arrangement shown in FIG. 4 unless the speed of rotation is kept low.

A mixture of solid particles and liquid is fed continuously to the rotating device shown in FIG. 6 by an inlet pipe or other means not shown on the diagram. The mixture enters the liquid layer 63 held against the wall of the bowl 60 by centrifugal force. Some particles will settle through the liquid 63 to the wall of the rotating bowl. Other particles and filtered residues which would otherwise tend to accumulate on the filtration medium 66 are removed therefrom by centrifugal force and are also caused to settle towards the inner wall of the bowl 60. Particles which accumulate along the wall are transported along the wall by the action of the screw conveyor 61 which rotates with the bowl on a common axis but at a slightly different speed. As the solids are transported out of the liquid 63 toward the small end of the bowl by the conveyor 61, said solid material 62 is drained after it emerges from the liquid and said material eventually reaches the end 64 of the bowl where it is discharged as shown by the arrows. At the other end of the bowl the liquid passes through the filter medium 66 under the pressure developed by centrifugal force and is thereby filtered, then the filtrate enters the porous support 67 where it is transported by centrifugal force through the porous support 67 to the liquid exit ports 68 where it is discharged from the bowl.

A slurry of solid particles in a liquid is fed through the top into the rotating device of FIG. 7. Solids 77 are deposited at the pipe wall by centrifugal settling action and solids are also removed from the filtration medium 71 and transported therefrom toward the pipe wall by centrifugal action. Liquid flows through the filtration medium 71 and its support 72 under the pressure developed in the liquid by centrifugal force. Liquid flow may be further augmented by applying vacuum at the bottom of the pipe, or pressure at the top of the pipe or both vacuum at the bottom and pressure at the top simultaneously. Filtrate runs down the inside wall of the pipe below the support 72 and is intercepted by the conduit 75. The approximate pathway of liquid flow is indicated by the arrows 78 and the path of flow of particles by the arrows 79. When the bowl of the device becomes filled with solids, operation must be discontinued and the bowl cleaned. Alternatively, during filtration solids may be removed continuously or continually through nozzles or other openings which can be provided in the wall of the pipe, or by other well known methods such as those that have been recited for the other devices described herein.

From the discussion above of the construction and operation of various embodiments of this invention it should be clear that the arrangement shown in FIG. 3 of filtration medium 31, and medium support comprising perforated plate 32 and randomly porous plate 33, could be employed in any of the devices shown in FIGS. 1, 2, 4, 6, and 7. Moreover, it should also be clear that the construction and arrangement shown in FIG. 5 to provide a better seal between filtration medium 54 and bowl 50 should be applicable to and employable in any of the devices shown in FIGS. 1, 2, 4, 6, and 7.

The devices and their operation described above are cited herein for purposes of illustration and are not meant to be limiting in any way. For example, two methods (nozzles in FIG. 1 and a screw conveyor in FIG. 6) have been presented above for continuously removing solids from a centrifugally regenerative filtration device. It is clear that other methods of solids removal may also be employed for centrifugally regenerative filtration (CRF). For example, a pusher may be substituted for the screw conveyor; such pushers are shown in FIG. 7-62 of *Unit Operations of Chemical Engineering* by McCabe and Smith cited above and FIG. 68 of *Industrial Filtration of Liquids* by Purchas, also cited above.

Although the above descriptions of various devices and their operation have focused primarily on systems consisting of liquids and solid particles, the instant invention may also be practiced using systems comprising liquid particles or solid particles contained within gases, or for systems of liquid particles contained within other liquids immiscible with the liquid which comprises the particles.

EXAMPLES

In the examples presented below the following three types of filtration technique are compared:

Type A. Vacuum filtration through a disc of 11-cm diameter filter paper using a Buchner funnel of appropriate size.

Type B. Ordinary filtration in the Laut filter with only a disc of 11-cm diameter filter paper arranged parallel to and against the cover and extending into the peripheral space between bowl and cover. No support was used.

Type C. Centrifugally regenerative filtration according to the present invention in the Laut filter modified according to the present invention by incorporation therein of a disc of 11-cm diameter filter paper and above said filter paper a disc of 11-cm diameter porous (porosity about 46% - thickness about 1/32 inch) Teflon support, both filter paper and support discs extending into the peripheral space between bowl and cover, as shown in FIG. 4.

EXAMPLE I

System filtered: slurry of about 3% by weight of ZnS [Fisher Scientific Company, Z-72; 80237; lot 723438] in water; pH of about 9 (pH adjusted with NaOH)
Filter paper: Eaton Dikeman No. 901-145
Percentage solids removal: 93–99%

| Volume of Filtrate Collected | Elapsed Filtration Time (in seconds) | |
|---|---|---|
| | Type A | Type C (bowl speed 5200 rpm) |
| 100 ml | 9 sec | 7 sec |
| 200 | 41 | 12 |
| 300 | 145 | 16 |
| 400 | 270 | 19 |
| 500 | 395 | 24 |
| 1000 | not measured | 110 |

EXAMPLE II

System filtered: secondary sludge from Bath Pa. municipal sewage treatment plant. Sludge was about 18% solids by mass.
Filter paper: Eaton Dikeman No. 320
Percentage solids removal: 95 – 99%

| Volume of Filtrate Collected | Elapsed Filtration Time (in seconds) | | |
|---|---|---|---|
| | Type A | Type B (bowl speed 7000 rpm) | Type C (bowl speed 5800 rpm) |
| 200 ml | — | 178 sec | — |
| 300 | 15 sec | 260 | 40 sec |
| 400 | 37 | — | 47 |
| 500 | 71 | — | 67 |
| 600 | 109 | — | 77 |
| 700 | 163 | 630 | 99 |
| 900 | — | 810 | 120 |
| 1000 | 360 | — | 144 |
| 1100 | 465 | — | — |
| 1200 | 600 | 1080 | 205 |
| 1500 | 1035 | — | 308 |
| 2000 | — | — | 690 |

EXAMPLE III

System filtered was an aqueous suspension of silica gel prepared as follows: Four liters of a solution prepared by diluting 1 $l$ of 37.6% sodium silicate solution* with 3 $l$ of water is mixed with one liter of a solution prepared by diluting 100 ml $H_2SO_4$ with 900 ml $H_2O$.

The resulting mixture is stirred while to it is slowly added an additional 3 l of H₂O. Rapid stirring is continued for about 1 hour thereafter to break up flocs.

Filter paper: Eaton Dikeman No. 320
Percentage solids removal: about 100%
*Philadelphia Quartz Type N sodium silicate solution

| Volume of Filtrate Collected (ml) | Elapsed Filtration Time (sec) | | |
|---|---|---|---|
| | Type A | Type B (bowl speed 7200 rpm) | Type C (bowl speed 5100rpm) |
| 50 ml | 60 sec | 300 sec | 20 sec |
| 80 | — | 480 | — |
| 100 | 175 | 593 | 55 |
| 150 | 320 | — | 94 |
| 200 | 550 | — | 160 |
| 250 | 735 | — | 270 |
| 300 | 960 | — | — |
| 350 | 1445 | — | — |

In each of the foregoing examples filtration medium of the same area was employed and for each individual example and test mixture-to-be-filtered the same grade of filter medium was employed. In technique Type A, the entire area of the filtration medium (filter paper) was active; in technique Type B, the filtration medium was not well defined and filtration took place through and by virtue of the peripheral space between the bowl and cover of the device (as disclosed in U.S. Pat. No. 3,464,554), with said peripheral space further constricted by inclusion of filter paper therein; in technique Type C the filter paper served as the filtration medium in the conventional way, with the probable restriction that the portion thereof primarily responsible for rapid filtration was that portion in contact with the mixture-to-be-filtered and from which particles were removed and upon which particles were prevented from accumulating by the action of centrifugal force.

Another filtration technique which was tried but for which no results are given above was that claimed and disclosed in U.S. Pat. No. 3,464,554; i.e., the Laut filter in which no filtration medium or support was incorporated. Using the Laut invention in this way, with no modification, very poor percentage removal of fine particulate solids was obtained, unless the cover was tightened upon the bowl to the extent that the flow of filtrate was severely restricted.

In each of the filtration techniques used and described above, adequate feed was provided and mixture-to-be-filtered, to insure the result that whatever limitations in flow rate that were observed were due to the method and apparatus employed for filtration and were not due to any feed rate limitation.

RESUME

From the foregoing examples it is evident that the present invention, as exemplified by technique Type C, provides an improved process and device for separating particles from a fluid as compared to the other techniques. The improved rapidity of filtration according to the present invention as compared to the other filtration techniques (Types A and B — all operated to obtain about the same percentage removal of particles from the fluid) may be seen by comparing the filtration times at equal volume of filtrate collected for the various techniques using the same type and size filter paper and test mixture of fluid and particles, as reported in the examples above. By utilizing centrifugal action to remove accumulating and accumulated residue from the site of filtration at the filtration medium during the filtration process according to the present invention, increasing resistance to fluid flow is avoided with the result that significantly greater portions of a mixture may be filtered in the same or in shorter time periods by the present invention, as compared to other filtration techniques using equal amounts of a conventional filtration medium.

The present invention thus provides method and apparatus that filters the same particle-fluid system to give approximately equal percentage removal of particles but with greatly increased filtration rates for the present invention as compared to other known systems incorporating the same type of filtration medium of comparable filtration area. Although the embodiment of the present invention used in the examples above is limited to batch operation because of accumulation of particulate residue in the apparatus used for said example, it is evident from the embodiments described and discussed above in connection with the diagrams of the Figures that the present invention can easily be adapted to incorporate continuous or continual removal of accumulated particulate residue, and can thereby be practiced effectively continuously. Accordingly, it should be possible to incorporate the present invention into a variety of centrifugal devices already known in the art as well as into processes practiced therewith.

The present invention can be employed for separating solid particles from liquids or liquid drops from continuous phases of other liquids in which the drops are immiscible. It can also be employed for separating either solid or liquid particles from gases. This invention should be widely applicable to the performance of such separations in the chemical, petroleum, mineral, metallurgical, paper, food, pharmaceutical, pollution-control and waste-treatment industries.

From the foregoing descriptions of preferred forms of the invention it is evident that it provides simple, effective and rapid filtration in which centrifugal force is used to overcome the accumulation of filtered residue which otherwise can greatly decrease flow rate. Although the invention has been described primarily for application to systems comprising solid particles and liquids, it is evident that it is equally applicable to systems of particles and fluids in general.

The foregoing disclosure and description of the invention is illustrative and explanatory thereof, and various changes in the method, as well as in the details of the illustrated constructions, may be made within the scope of the appended claims without departing from the spirit of the invention.

What is claimed and intended to be covered by Letters Patent is:

1. A method of separating particles from a mixture thereof with fluid which comprises:
   a. introducing said mixture into a rotatable container having an internal wall disposed oppositely from the axis of rotation of said container and adapted to collect dense particulate portions of said material-to-be-filtered, said container also having therein a porous filtration surface disposed at an angle with respect to said internal wall, b. causing fluid to pass through said porous filtration surface thereby filtering said particles from said mixture, c. rotating said container thereby causing said filtered particles to be removed from said filtration surface toward said inner wall of said container by centrifugal action, d. recovering the filtered fluid thereby produced.

2. The method of claim 1 wherein the fluid is liquid and the particles are solids.

3. The method of claim 2 wherein a residue of particles is recovered from said rotating container through exit orifice means provided in the wall thereof.

4. The method of claim 2 wherein a residue of particles is removed from said container by a screw conveyor.

5. The method of claim 2 wherein an external pressure causes said liquid to flow through said filtration medium.

6. Improved centrifugal filter apparatus comprising:
a. a rotatable chamber adapted to contain material-to-be-filtered,
b. an internal wall of said chamber disposed oppositely from the axis of rotation of said chamber and adapted to collect dense particulate portions of said material-to-be-filtered, c. a porous filtration surface within said rotatable chamber disposed at an angle with respect to said internal wall (b) of said chamber and adapted for passage of said less dense filtrate portions of said mixture, d. passage means adjacent to said porous filtration surface adapted to carry away said filtrate, e. said porous filtration surface (c) being disposed at such an angle with respect to the axis of rotation of said chamber that suspended particulates in said mixture tend to be removed from said filtration surface by the centrifugal effect induced by rotation of said chamber.

7. Improved centrifugal filter apparatus according to claim 6 wherein the internal wall (b) of said chamber (a) is inclined at an angle with respect to the axis of rotation of said chamber, to urge said particulates to accumulate in a restricted region.

8. Improved centrifugal filter device according to claim 7 additionally comprising exit orifice means located adjacent the restricted region of claim 7 to remove said accumulated particulates.

9. Improved centrifugal filter apparatus according to claim 6 wherein the porous filtration surface (c) is disposed substantially perpendicularly to said axis of rotation.

10. Improved centrifugal filter apparatus according to claim 6 wherein the porous filtration surface substantially faces away from said axis of rotation.

* * * * *